Nov. 14, 1967 A. L. LITMAN 3,352,227
BACON COOKER

Original Filed Sept. 16, 1963

INVENTOR.
ALAN L. LITMAN
BY Green, McCallister & Miller
HIS ATTORNEYS

Nov. 14, 1967

A. L. LITMAN 3,352,227

BACON COOKER

Original Filed Sept. 16, 1963

INVENTOR
ALAN L. LITMAN
BY Green, McCallister & Miller
HIS ATTORNEYS

United States Patent Office 3,352,227
Patented Nov. 14, 1967

3,352,227
BACON COOKER
Alan L. Litman, 114 Hartwood Drive,
Pittsburgh, Pa. 15208
Substituted for abandoned application Ser. No. 309,100, Sept. 16, 1963. This application Nov. 18, 1965, Ser. No. 516,194
9 Claims. (Cl. 99—341)

ABSTRACT OF THE DISCLOSURE

Thin meat products such as bacon are broiled principally by infrared heat while supported between clamping plates that maintain its shape.

---

This invention relates to a tabletop broiler for cooking thin meat products such as bacon. With this invention the preparation of breakfast bacon becomes as simple and as automatic as the preparation of toast in the modern toaster. Furthermore, the invention will completely eliminate the grease spattering and undesirable bacon curl that currently result from cooking bacon by conventional apparatus.

Housewives and other cooks have long been plagued with grease spattering from a frying pan full of bacon. Spattering bacon grease is both painful and messy. Frying pan cooked bacon, tends to shrivel and curl as the fat is cooked out of it, producing an inconvenient and somewhat unsightly product. Furthermore, such bacon retains or reabsorbs a substantial amount of grease which is usually drained by placing the bacon upon paper toweling or other absorbent material before it is served. A mess always results from this dual handling of the bacon and the housewife's time is unnecessarily consumed thereby. The housewife's time is further consumed by having to watch bacon cooking in the frying pan and turn it over at the proper instant so as to cook both sides evenly and avoid scorch. Another time consuming chore is the scouring required to clean a frying pan after it has been used to cook bacon. This factor, in itself, significantly limits the use of bacon in many households.

Accordingly, it has been an object of this invention to fully investigate the practical, aesthetic and economic problems of cooking bacon in relatively small, i.e., family size quantities;

Another object of this invention has been to provide bacon cooking apparatus that operates quickly and cleanly so as to be usable at the table and much in the same way as an electric toaster;

Another important object of my invention has been to provide bacon cooking apparatus that is controllable by a simple timing device so as to insure reproducible cooking results while employing inexpensive components;

A further object of my invention has been to provide bacon cooking apparatus that produces relatively flat crisp bacon having a minimum of undesirable grease retained therein;

A further important object of my invention has been to provide bacon cooking apparatus that is as easy to clean as the plates off which the bacon is eaten;

Another object of my invention has been to provide bacon cooking apparatus that will accomplish the foregoing objects without adversely affecting the accepted desirable flavor of the bacon cooked;

These and other objects of my invention will be apparent to those skilled in the art upon reading and understanding the following disclosure of my inventive concepts and a description of an illustrative embodiment thereof.

One phase of my invention involves the use of an electrically energized infrared energy source that transmits heat by radiation directly to the bacon without significantly heating the air or other materials in between. I have determined that bacon will readily absorb infrared radiation within the frequency emission range produced by relatively inexpensive, commercially available infrared heating elements.

Bacon, being thin relative to most other meat products, is cooked quite efficiently by the penetration of heat rays such that very little temperature differential is established across the bacon thickness. Also the thinness of the bacon permits a significant amount of infrared energy to pass through the bacon and be reflected by suitable means into the opposed surface of the bacon. The uniform cooking resulting from combining infrared energy with the thin meat products prevents one-sided shrinkage that presently causes curl. Also since both sides of the bacon and indeed the interior of the bacon receive heat substantially simultaneously, the time of cooking is considerably reduced. Infrared energy is much more controllable in direction and amount than more conventional heat forms. Accordingly, I have provided inexpensive direction control means (reflectors) and total heat control means (a simple timer) that will effectively provide the control necessary to repeatedly and uniformly provide crisp, flavorful bacon.

Another phase of my invention relates to the use of a vertical bacon support rack composed of a pair of mutually juxtaposed infrared transparent plates. Preferably the plates are made of a material such as quartz-base glass. By supporting the bacon vertically during cooking, the grease will drain by gravity as it is produced to leave the bacon clean and grease free. The grease is easily collected in a removable trough without mess. Furthermore, the vertical orientation of the bacon permits selective heat transfer since only heat produced by operation of the infrared emitting element will be efficiently transferred horizontally into the bacon. Residual and incidental heat in the heating element when not in operation, and in the surrounding parts of the cooker, is removed from the cooker rapidly by a vertical convective flow of air. This selective heat transfer characteristic minimizes thermal time lag problems which so frequently arise in using high mass electrical heating elements. Once the thermal time lag has been eliminated, a simple timer mechanism can be employed to accurately and effectively control the total amount of heat input and the end point of the cooking process. Furthermore, when cooking is completed the bacon can be left in the cooker for as long as desired without over-cooking.

The transparent glass plates perform another significant function in eliminating the splashing or spattering of grease as it is driven from the surface of the bacon. To insure the clean operation that is necessary for my bacon cooker to be employed as a table-operated device, I provide simple overlapping flanges at the lateral edges of the glass bacon-holding plates. Also, since the bacon-holding plates are made of glass and since no significant thermal gradient exists between the glass and the bacon, there will be no tendency for the bacon or the grease to burn or scorch on the glass. Thus, the glass bacon-holding plates can be readily cleaned simply by soaking in an ordinary household soap solution.

Another phase of my invention relates to a particular surface contour of the bacon-holding plates that promotes rapid grease drainage and also permits a vertically upward convective flow of air past the surface of the bacon. I have discovered that bacon cooked in the absence of air has a slightly different taste due probably to the lack of oxidized fats. By providing small vertical grooves along the inner or bacon contacting surfaces of the bacon-holding plates, heat from the bacon causes a vertically upward convective flow of air to oxidize the surface fats and give the bacon its characteristic flavor. Also, there is no tendency for bacon grease to be pressure-retained as would be the case with plain flat plates.

Another important phase of my invention relates to the use of a dichroic infrared reflector which is transparent to visible light but is nearly 75% efficient in reflecting infrared light within the frequency range that will be absorbed by bacon. The infrared heat source employed in my bacon fryer may thus be positioned entirely on one side of the bacon. Heat from the emitting source will pass into, around and through the bacon, be reflected, and returned to the bacon so that very little radiant heat is lost. The dichroic reflector also makes it possible for the cook to watch the bacon cooking without being uncomfortable from the direct view of the infrared emitting elements. While the dichroic reflector can be positioned anywhere on the side of the bacon away from the source, for structural simplicity, I prefer to incorporate it directly onto one of the glass bacon-holding plates as a surface coating.

These phases or inventive concepts of my invention will be better understood by referring to the following description of my illustrative embodiment wherein reference is made to the accompanying drawings of which:

Figure 1:
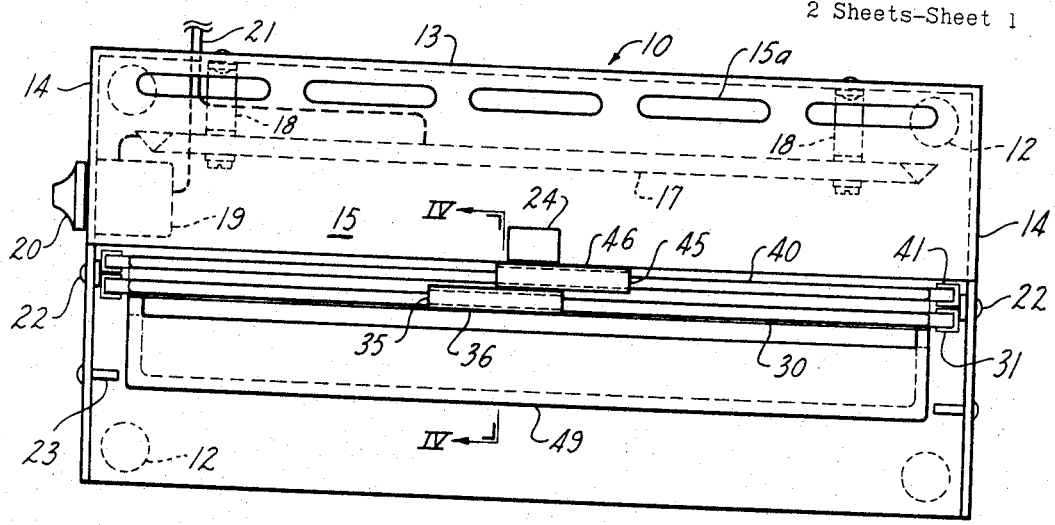
FIGURE 1 is a top or plan view of a bacon cooker constructed in accordance with my invention.
Figure 2:
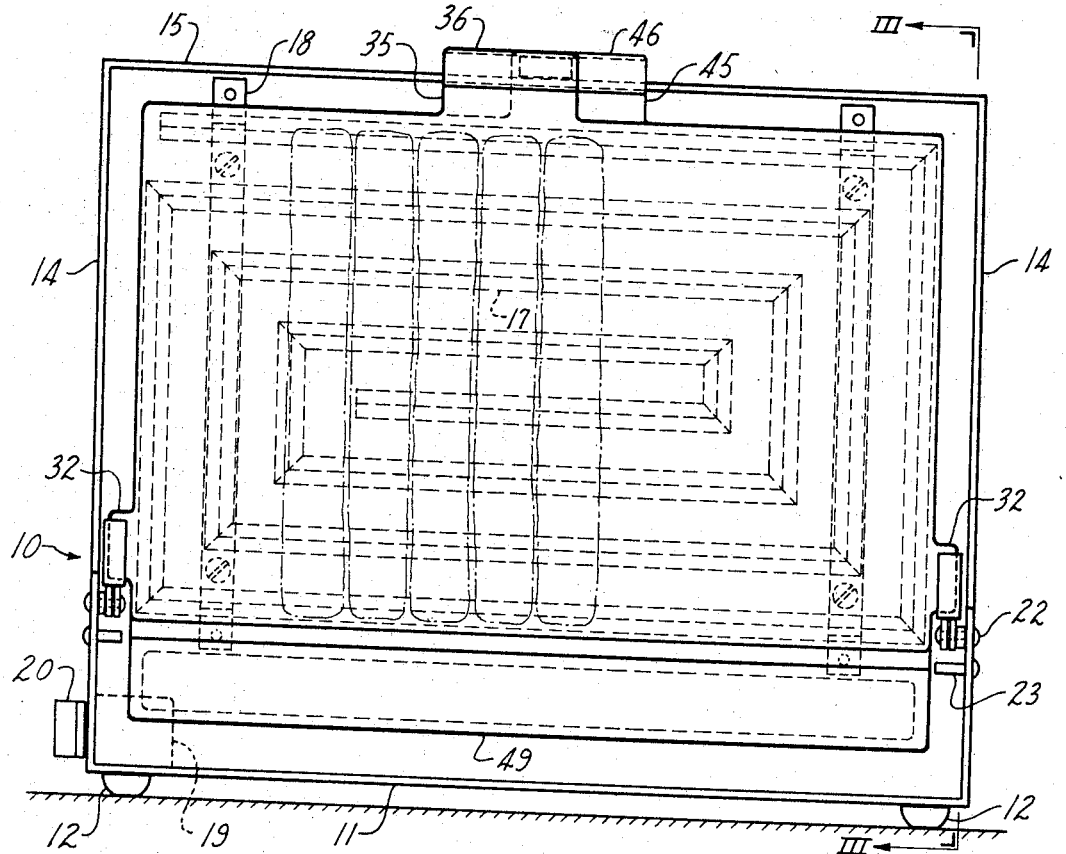
FIGURE 2 is a front elevational view of the bacon cooker showing several strips of bacon in cooking position.
Figure 3:
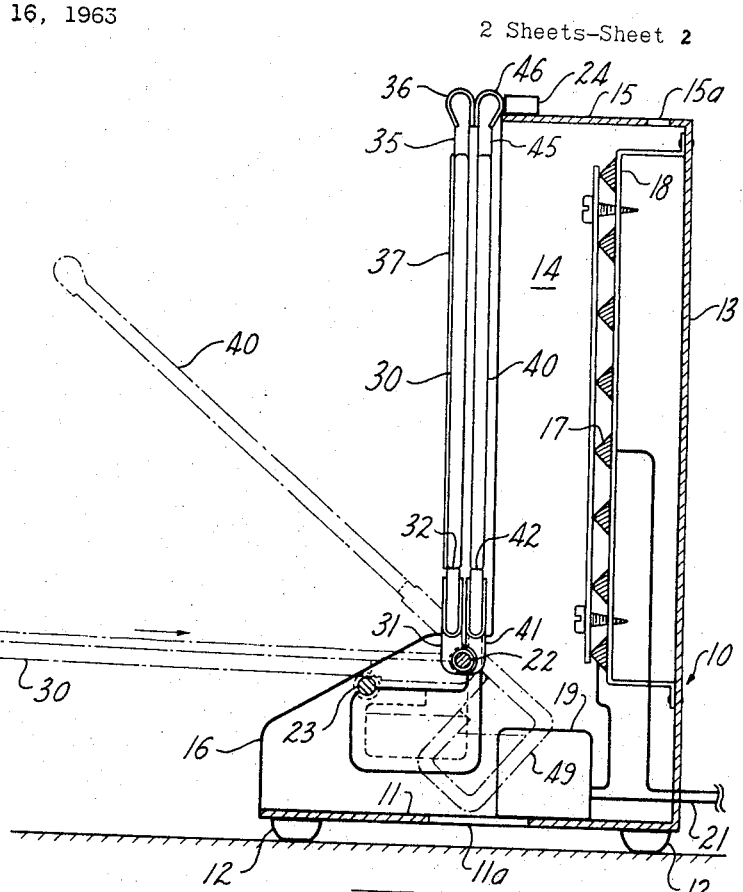
FIGURE 3 is a side elevational view of the bacon cooker in cross section, taken along line III—III of FIGURE 2.

Turning now more specifically to the drawings, in FIGURES 1 through 3 there is shown a table top bacon fryer or cooking apparatus having a vertically extending rigid sheet metal casing 10 in the form of an open sided box-like structure. The casing 10 has a horizontal bottom wall or base 11 from which a plurality of table receiving feet or buttons 12 downwardly extend. The casing 10 further has a vertically extending back wall 13, opposed side walls 14 and a top wall 15 that is substantially shorter than the bottom wall 11. The side walls 14 extend forwardly of the top wall 15 adjacent the lower end of the casing 10 to form an extended support portion or side wall extension 16 (see FIGURE 3) that carries the bacon-holding structure.

A vertically extending infrared emitting coil or serpentine infrared energy source 17 is supported in a spaced relationship from the back wall 13 of the casing 10 by a pair of width-wise spaced-apart insulated clamping straps 18. The vertically extending source 17 thus directs infrared energy horizontally outwardly of the casing 10. Lower vent openings 11a (see FIGURE 3) in the bottom wall 11, and upper vent openings 15a (see FIGURES 1 and 3) in the top wall 15 permit a convective flow of air to cool the apparatus and eliminate thermal lag in the system. A time responsive, control switch operating mechanism 19, having a manually displaceable input handle 20 is mounted in the lower portion of one wall 14 and in a series relationship with the source 17 and an ordinary house current utility cord 21.

As best shown in FIGURE 3, a pair of mutually coextensive infrared-transparent, fluid-impervious plates 30 and 40 (preferably made of quartz base glass) are pivotally mounted on the side wall extensions 16 of the casing 10 to provide means for supporting the bacon or other thin meat product in the horizontal path of infrared energy from the source 17. The source 17 is spaced from the plates 30 and 40 to minimize direct conduction heating thereof which could cause localized overheating.

Figure 6:
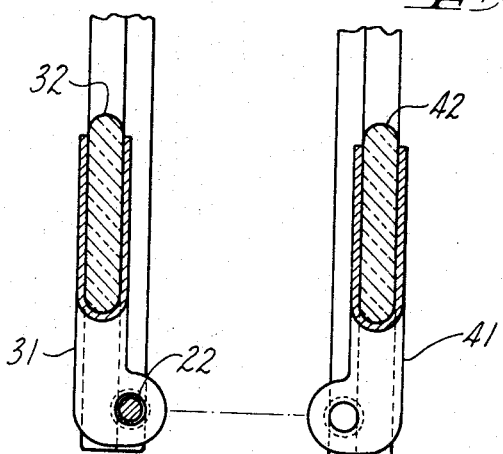
FIGURE 6 is an enlarged exploded fragmental view of a structural feature of the bacon cooker.

In the full line position shown in FIGURE 3, the plates 30 and 40 extend vertically and have inwardly facing surfaces that are mutually juxtaposed for clamp-supporting the bacon therebetween. The plates 30 and 40 are removably supported by a pair of upwardly open cradle brackets or saddle trunnions 31 and 41 respectively, which are most clearly shown in the enlarged exploded view of FIGURE 6. Referring to FIGURES 2, 3 and 6, it will be seen that the plates 30 and 40 are provided with a pair of vertically elongated ears or support projections 32 and 42 respectively. These projections are held by gravity in upwardly open channel cavities provided by the saddle members 31 and 41 respectively. The saddle members 31 and 41 are pivotally connected to the side wall extensions 16 of the casing 10 by a rivet or other pivot axis means 22. It will be appreciated that by making the plates 30 and 40 pivot about a common axis, they will not move laterally with respect to each other during pivotal motion.

A stop member formed by a cantilevered rivet or other convenient projection device 23 is positioned in the pivotal path of the plate 30 to support the plate in a generally horizontal but slightly inclined orientation. Such orientation retains the plate securely in its saddle 31 and also permits final drainage of the bacon grease.

Figure 4:
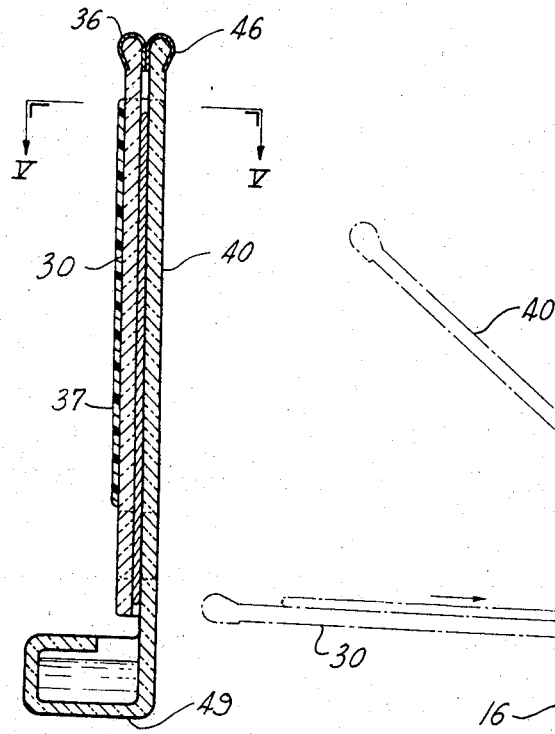
FIGURE 4 is a partial side elevational view in cross section taken along line IV—IV of FIGURE 1.
Figure 5:
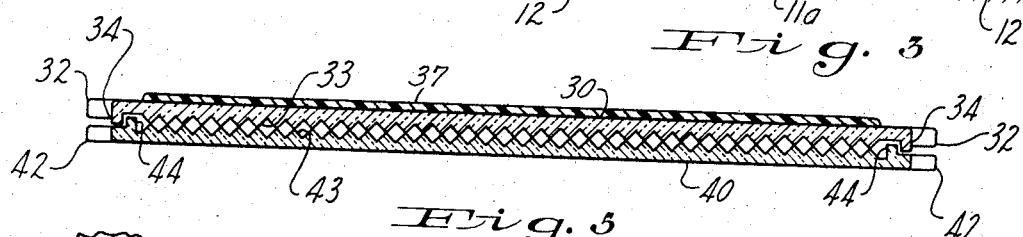
FIGURE 5 is a partial top or plan cross-sectional view taken along lines V—V of FIGURE 4.

The preferred structure of the plates 30 and 40 is shown most clearly in the cross sectional views of FIGURES 4 and 5. It is to be understood, however, that the broad concept of my invention may be applied to a different plate construction without departing from the scope of my invention. Looking down on the plate cross-section as shown in FIGURE 5, it is seen that each of the plates 30 and 40 is generally planar and has an inwardly facing bacon support surface that is serrated or provided with a plurality of vertically extending grooves formed by alternate triangular cross sectional projections 33 and 43 respectively.

I have determined that projections 33 and 43 serve to better hold the bacon in position due to the reduced contact cross sectional area. The projections thus eliminate any problems of slippage of the bacon from between the plates. I have also found that the vertical grooves should extend the entire vertical height of the plates 30 and 40 so that air can circulate by convection past a major surface of the bacon. A significant part of the characteristic bacon flavor is due to some oxidation of the bacon fat which would not be possible if the bacon were held tightly between completely flat plates. Furthermore, completely flat plates will retard to some extent, the removal of fat and grease from the bacon. The vertical grooves of my invention permit grease to drain freely from the bacon as it is formed.

The plates 30 and 40, being impervious to moisture and grease, prevent grease from splattering outwardly onto the table or the cook. To insure that grease does not splatter sideways from the space between the plates 30 and 40, I provide an elementary labyrinth construction composed of overlapping edge projections 34 and 44 that form a barrier to any grease tending to move laterally outwardly of the plates. It will be seen that all of the grease emitted from the bacon during cooking will be permitted to drain downwardly and out of contact with the bacon. Conveniently, the grease is caught in a removable trough 49 that preferably is made integral with the plates 40. By such construction, only the two glass plates need be washed. The trough 49 is an upwardly-open cavity having a cross-sectional configuration which will permit the trough to contain all of the grease produced by a maximum number of bacon strips either in a vertical position or in a horizontal position. Inasmuch as the bacon cooker employs no conduction heat transfer, the chances of burning are virtually eliminated. Simple unburned grease is readily dissolved in even mild soaps so that the glass plates 30 and 40 can be cleaned merely by soaking and rinsing.

Referring now to FIGURES 1, 2 and 3, it is seen that the upper edge of each of the plates 30 and 40 is provided with a widthwise extending vertical tab or handle 35 and 45 respectively. These handles partially-mutually overlap as shown particularly in FIGURE 1, to permit the user to grasp either of the plates individually or to grasp both of the plates simultaneously. The upper end of each of the handles 35 and 45 is beaded or bulged to receive a pressed or clamped ferritic stainless steel magnetically permeable sleeve 36 and 46 respectively. The sleeves 36 and 46, like the handles 35 and 45, overlap, and in the overlapped portion, are permitted to contact each other. A latch composed of a permanent magnet 24 is mounted at the top of the casing 10 on the top wall 15 and is positioned adjacent the overlapped portions of the sleeves 36 and 46. When the plates 30 and 40 are in the "up" position as shown in FIGURES 1, 2 and 3, the magnetic flux of the magnet 24 will permeate the iron-base sleeves 36 and 46 to hold the plates in their upright position. Also, when it is desired to hold only one of the plates upright, the same magnet performs the job without any mechanical complexity whatsoever.

The outer plate 30 is coated with a dichroic surface 37 of the type that reflects infrared energy but is transparent to visible light. Such coatings are commercially available and are effective to the extent of reflecting up to 75% of the usual infrared spectrum and permitting upwards of 90% of visible light to pass through.

The dichroic surface on the plate 30 will thus permit the user to watch the bacon cooking and it will protect the user from the infrared energy produced by the elements 17. More importantly, however, the high efficiency of the dichroic surface permits very rapid heat transmission and efficient use of energy so that bacon can be cooked in less than two minutes, with all the convenience of an ordinary table top toaster.

The operation of this device thus described is as follows: Bacon is taken directly from the refrigerator and placed on the plate 30 which has been folded down to a loading or battery position as shown in the broken lines of FIGURE 3. Due to the slight inward inclination of the plate 30 provided by location of the support pin 22, there is no danger that the plate 30 will slip out of its supporting saddle 31. After the bacon is laid in parallel strips along the inner surface of the plate 30, the plate 40 is brought down into contact with the upwardly facing surface of the bacon. Both handles 35 and 45 are then grasped at their overlapping portions and the assembly is pivoted back to the vertical position. The timer 19 is set by turning the handle 20 to a predetermined cooking time according to the taste of the user. Immediately, the heating element 17 begins to rapidly heat the bacon, as the heat transfer does not depend upon the heating of either a large mass of resistance elements or of a thermal carrying medium such as air.

Much of the infrared energy will pass dirctly into the bacon and be absorbed in the form of sensible heat. The energy passing through or by the bacon will strike the dichroic surface 37 of the plate 30 and be efficiently reflected back onto the bacon. As the bacon cooks the glass plates 30 and 40 will be heated only slightly due to incidental absorption of infrared and by heat conducted from the bacon. The heat of the bacon and to some extent the heat of the plates will cause a convective upward flow of air passing the surface of the bacon oxidizing a sufficient amount of bacon to give the characteristic flavor subtleties. As the bacon cooks, the grease will be driven out and will drip down into the trough portion 49 of the plate 40 without splattering the table, the cook or the device.

After the timer 19 has completed its operation, the heating element 17 will be shut down and there will be no chance of thermal overshoot since there is very little thermal mass involved in the heating process. Furthermore, the thermal mass is cooled by a convective flow of air through openings 11a and 15a. The bacon will be somewhat insulated by the glass so that any residual heat in the apparatus passing through the insulation will just about balance any cooling effect due to air moving past the bacon. The bacon thus can stay in the cooker for a substantial length of time awaiting service. If desired, the bacon may be conveniently and attractively served directly from the plate 30, without dirtying additional dishes. After the meal is finished, the plates 30 and 40 are removed from the bacon fryer and the trough 49 is emptied of the liquid grease. The plates 30 and 40 are cleaned by immersion in any soap or detergent solution. If desired, a washrag can be run over the surfaces lightly and into the trough 49, however, such is not required since only unburned grease is involved. After washing, the plates are rinsed, dried and placed back into the cooker ready for the next meal.

It will be appreciated that a bacon cooking apparatus as described herein is a substantial improvement over the conventional methods of cooking bacon. Furthermore, the fryer described herein requires much less maintenance than conventional frying apparatus, due to the absence of high thermal gradients across contacting surfaces.

While a preferred embodiment of my invention has been shown herein for purposes of illustration, it is understood that various changes may be made in this construction by those skilled in the art without departing from the spirit and disclosed concepts of the invention, as particularly pointed out and defined in the appended claims.

I claim:

1. Apparatus for broiling thin meat products comprising:
 a base;
 a source of infrared energy supportingly connected to said base for directing infrared energy outwardly therefrom along a path;
 meat product support means spaced from said source and positioned in the path of said infrared energy, said support means comprising:
 a pair of upwardly-extending, fluid-impervious, infrared-transparent plates having inwardly-facing surfaces that are mutually juxtaposed and interconnected for supporting the meat product therebetween, in the path of said infrared energy, said surfaces of said plates having a plurality of downwardly-directed drainage grooves formed therein, and selectively releasable means for clamping said plates together.

2. Apparatus as defined in claim 1 wherein the mutually juxtaposed surfaces of said plates are provided with overlapping edge projections to prevent sidewise escape of grease.

3. Broiling apparatus as defined in claim 1, further comprising an upwardly-open trough positioned below said plates in flow alignment with said grooves.

4. Apparatus as defined in claim 3 wherein said upwardly open trough is formed integrally with one of said plates.

5. Apparatus as defined in claim 3 wherein said clamping means includes a pair of outwardly-extending, partially-mutually-overlapping handle portions of said plates, and means cooperating with said handle portions for holding one or both of said plates in a vertical position.

6. Apparatus as defined in claim 5 wherein said holding means comprises a pair of magnetically permeable sleeves mounted on the mutually overlapping portions of said handle, and a magnet mounted on said casing for holdingly attracting one or both of said sleeves.

7. Broiling apparatus as defined in claim 1, further comprising means connecting both of said plates to said casing for permitting pivotal motion of said plates with respect to said base about a single axis.

8. Broiling apparatus as defined in claim 1, further comprising dichroic surface means provided on the one of said plates that is distal from said source for transmitting visible light outwardly therefrom while reflecting infrared energy back toward said source.

9. Apparatus for broiling thin meat products comprising: a vertically-extending box-like casing having a horizontal base and at least one open vertical side wall; an electrically-energizable source of infrared energy mounted within said casing and lying generally in a vertical plane to direct infrared energy horizontally outwardly of said casing through said open vertical side wall; means for supporting said thin meat products in the path of said outwardly directed infrared energy, said support means comprising:

a first vertically-extending, fluid-impervious, infrared-transparent plate having one surface that is provided with vertically-extending serrations over substantially its entire area, said first plate further having a dichroic surface for transmitting visible light while reflecting infrared energy;

a second vertically-extending, fluid-impervious, infrared-transparent plate that is positioned between said first vertically-extending plate and said source of infrared energy and is horizontally aligned therewith, said second vertically-extending plate having a surface that is provided with vertically-extending serrations over substantially its entire area, said second plate further having an upwardly-open trough portion formed integrally therewith adjacent its lower end;

each of said first and second plate members having outwardly-extending ear portions projecting from their lateral edges;

each of said plate members also having upwardly projecting handle portions extending from their respective top edges and located so as to partially overlap when the serrated surfaces of said plate members are mutually juxtaposed, a ferritic-base metal sleeve securely connected to each of said handle portions;

said serrated surface portions of said plate members having vertically-elongated, horizontally-extending projections adjacent their lateral side edges which overlap to form fluid barriers when said serrated surfaces are mutually juxtaposed;

a first pair of opposed saddle members pivotally connected to said casing, said first pair of saddle members each having an upwardly open cavity therein for removably receiving the ear portions of said first plate member;

a second pair of opposed saddle members pivotally connected to said casing in a manner coaxial with said first pair of saddle members, said second pair of saddle members each having an upwardly open cavity for removably receiving said ears of said second plate member;

a permanent magnet securely connected to an upper portion of said casing for holdingly attracting said ferritic base metal sleeves on said handle portions of said plate members;

an electrical conduit for supplying electric current to said infrared energy source, a switch-operating timer mechanism operatively connected to said circuit to control energization of said infrared energy source in response to a pre-set timed interval; and ventilation opening means in said casing for permitting a convective flow of air therethrough.

References Cited

UNITED STATES PATENTS

| | | | |
|---|---|---|---|
| 706,502 | 8/1902 | Van Wie | 99—393 |
| 1,656,662 | 1/1928 | Carter et al. | 99—375 X |
| 1,699,221 | 1/1929 | Carter | 99—410 |
| 1,809,580 | 6/1931 | Carter | 99—375 X |
| 2,288,688 | 7/1942 | Dubilier | 248—206 |
| 2,414,653 | 1/1947 | Lookholder | 248—206 |
| 2,580,099 | 12/1951 | Jaeger | 248—206 |
| 2,644,880 | 7/1953 | Valentini et al. | 99—379 X |
| 2,798,943 | 7/1957 | Prideaux. | |
| 2,751,840 | 6/1956 | Layton et al. | 99—341 X |
| 2,824,943 | 2/1958 | Laughlin | 219—411 |
| 3,010,383 | 11/1961 | Greene | 99—349 X |
| 3,098,924 | 7/1963 | Salton et al. | 99—341 X |
| 3,124,501 | 3/1964 | Wise. | |

BILLY J. WILHITE, *Primary Examiner.*